United States Patent Office 3,270,095
Patented August 30, 1966

3,270,095
FLUORO-CHLORO SUBSTITUTED PHOSPHORUS CONTAINING ESTERS
Hugo Malz, Leverkusen-Wiesdorf, Hans Kükenthal, Leverkusen-Bayerwerk, Wolfgang Behrenz, Wuppertal-Elberfeld, Erich Klauke, Cologne-Flittard, and Engelbert Kühle, Cologne-Stammheim, Germany, assignors to Farbenfabriken Bayer Aktiengesellschaft, Leverkusen, Germany, a German corporation
No Drawing. Filed May 22, 1963, Ser. No. 282,215
Claims priority, application Germany, May 26, 1962,
F 36,913
20 Claims. (Cl. 260—955)

The present invention relates to and has as its objects novel and useful pesticidally especially insecticidally active phosphorus-containing compounds. More specifically this invention relates to fluorine-containing thiophosphoric, -phosphonic or -phosphinic acid esters and ester amides of the general formula

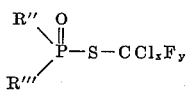

wherein R″ and R‴ denote the same or different optionally substituted hydrocarbon radicals which are linked directly or via an oxygen, nitrogen, or sulphur atom to the phosphorus atom and $x$ is an integer of 0 to 2, whilst $y$ has the value of 1, 2, or 3, where the sum $x+y$ should be equal to 3.

It is already known that O,O-di- and O,O,O-tri-alkyl esters of phosphorous acid react with trichloromethylsulphenyl chloride to produce the corresponding O,O-dialkyl-thiolphosphoric acid-S-trichloromethyl esters according to the following scheme of formulae:

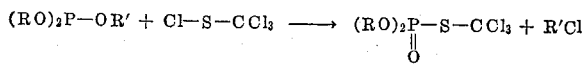

In the above equation, R represents alkyl groups, whilst R′ denotes a hydrogen atom or an alkyl radical.

However, this reaction is adversely affected to a considerable extent by various interfering side reactions. Thus, for instance, the halogen atoms of the trichloromethyl group are sufficiently reactive to be also capable of reacting with esters of phosphorous acid according to the mechanism of an Arbuzov reaction, leading to the formation of undesirable side products. Moreover, when O,O-dialkyl esters of phosphorous acid react with trichloromethyl-sulphenyl chloride, thiophosgene and O,O-dialkyl-phosphoric acid ester-monochlorides are also formed, being produced according to the following equation:

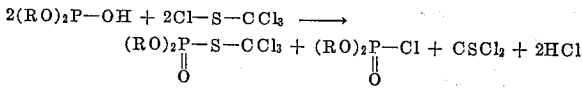

In the last-mentioned formula, the radical R has the above stated significance.

In addition, it has already been proposed to employ these reaction products, which are usually not chemically homogeneous, as pest control agents, but owing to their weak biocidal activity these substances have not achieved any practical importance.

In accordance with the present invention it has now been found that quite unexpectedly fluorine-containing chloromethyl-sulphenyl halides can be reacted smoothly with O,O-di- and O,O,O-tri-alkyl esters of phosphorous acid, moreover quite generally with all those compounds of trivalent phosphorus which can undergo an Arbuzov reaction, to form the corresponding fluoro(chloro)-methyl-thiolphosphoric (-onic, -inic) acid esters in nearly quantitative yields. During this process, the reaction proceeds in accordance with the following equation:

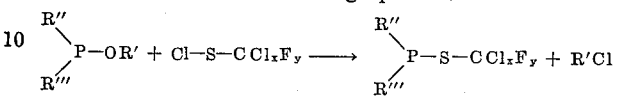

wherein R″, R‴, $x$ and $y$ have the same significance as given above.

R″ and R‴ preferably represent alkyl, alkoxy, alkylcapto, aryl, aryloxy, aralkyl, aralkoxy, cycloalkyl, cycloalkoxy, amino, N-alkylamino, or N,N-dialkylamino groups.

The interfering side reactions which can be observed during the above mentioned known reaction of O,O-di- and O,O,O-tri-alkyl esters of phosphorous acid with trichloromethyl-sulphenyl chloride (perchloromethyl mercaptan) do not arise at all during the inventive process, so that according to the present invention a simple production of chemically definite and technically valuable products is made possible. For instance, the reaction of monofluorodichloromethyl-sulphenyl chloride with O,O-dialkyl esters of phosphorous acid proceeds without the formation of the side products to be observed in the corresponding reaction with perchloromethyl mercaptan (thiophosgene and O,O-dialkyl-phosphoric acid-ester chlorides) giving O,O-dialkyl-thiolphosphoric acid-S-(fluorodichloromethyl) esters in yields of more than 90% of the theoretical. The undesirable side reaction of the halogen atoms in the trihalogenomethyl group with the esters of phosphorous acid is also avoided during the inventive reaction.

The process according to the invention is preferably carried out at temperatures between about −30 and +150° C. (particularly zero to 100° C.), when in many cases it is an advantage to operate in the presence of inert solvents or diluents for the better control of the reaction which in general proceeds exothermally.

The following compounds of trivalent phosphorus can for instance be reacted within the scope of the present invention: alkyl esters of phosphorous, phosphonous, and phosphinous acid, amido-, N-alkylamido-, and N,N-dialkyl-amido-phosphorous and -phosphonous acid esters as well as the corresponding thiol compounds, provided that they are capable of undergoing an Arbuzov reaction. Among the fluorine-containing chloromethyl-sulphenyl chlorides, the fluoro-dichloromethyl-, difluorochloromethyl-, and trifluoromethyl-sulphenyl derivatives are particularly intended for an application as starting materials. The process according to the invention is carried out by the method of adding solutions or dilutions of the above mentioned compounds of trivalent phosphorus drop-wise to those of the corresponding fluorine-containing chloromethyl-sulphenyl chlorides, the starting components being preferably applied in equimolar proportions by weight. The ensuing reaction, which is usually strongly exothermal, may optionally be moderated somewhat by external cooling of the mixture. The alkyl chlorides formed as side products during the reaction can be removed from the mixture during or after the reaction by a method known per se. When the reaction is carried out with the use of O,O-dialkyl-phosphorous acid esters as starting materials, it is sometimes an advantage to work in an atmosphere of protective gas. For this purpose, it is for example possible to pass a weak current of nitrogen or another inert gas through the reaction mixture so as to facilitate the discharge of the liberated hydrogen chloride. In addition, it is often useful to continue stirring the mixture at slightly to moderately elevated temperatures (about 35 to 65° C.) for some time (¼ to 1 hour) after the combination of the starting components in order to complete the reaction, whereafter the solvents or diluents are separated according to methods known per se and the products of the process are isolated in the form of colourless to light-brown oils, usually in excellent yields. In many cases, it is possible to purify the compounds obtainable according to the invention further by means of distillation, but in general these are already obtained in a sufficiently pure form to make purification unnecessary. The thio-phosphoric (-phosphonic, -phosphinic) acid esters which can be prepared according to the invention are characterised by an unexpectedly strong insecticidal activity which surpasses essentially that of the above mentioned known thiol-phosphoric acid-S-trichloromethyl esters. The rapid effectiveness of the inventive products is of particular advantage for this purpose, as well as the fact that, as organic phosphorus compounds, their toxicity towards warm-blooded creatures is relatively slight.

The following examples illustrate the present invention in more detail:

*Example 1*

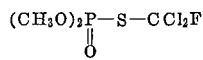

A solution of 22 g. of O,O-dimethyl-phosphorous acid ester in 50 ml. of benzene is added dropwise to a solution of 34 g. of fluorodichloromethyl-sulphenyl chloride in 100 ml. of benzene whilst stirring the mixture and introducing a weak current of dry nitrogen. A weakly exothermal reaction is to be observed. An internal temperature of about 30 to 45° C is maintained by appropriate external cooling of the mixture. The hydrogen chloride formed as the side product is discharged with the current of nitrogen via a drying tube filled with calcium chloride. When the reaction has been completed, the reaction mixture is stirred at 50 to 60° C. for about ¼ hour, and it is then evaporated under reduced pressure until the solvent has been completely removed. About 44 g. of the O,O-dimethyl-thiolphosphoric acid-S-(fluorodichloromethyl) ester remain in the form of a light yellow oil which is fractionated in vacuo and distills at 63 to 65° C. at a pressure of 0.1 mm. Hg.

*Analysis.*—Calc. for $C_3H_6O_3PSCl_2F$: C, 14.8%; H, 2.5%; P, 12.8%; S, 13.2%; Cl, 29.2%; F, 7.7%. Found: C, 14.8%; H, 2.5%; P, 12.9%; S, 13.4%; Cl, 29.1%; F, 7.7%.

The same compound is obtained by adding a benzene solution of 24.8 g. of O,O,O-trimethyl-phosphorous acid ester dropwise to a benzene solution of 34 g. of fluorodichloromethyl-sulphenylchloride by the described method and evaporating the reaction mixture under reduced pressure after the reaction has been completed.

*Example 2*

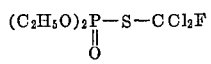

A solution of 0.2 mole of O,O-diethyl-phosphorous acid ester in 75 ml. of benzene is added dropwise to a solution of 0.2 mole of fluorodichloromethyl-sulphenyl chloride in 100 ml. of benzene, under reaction conditions analogous to those in Example 1. When the mixture has been worked up by the method as described, a colourless to light yellow oil is obtained which can be distilled in vacuo. The O,O-diethyl-thiol-phosphoric acid-S-(fluorodichloromethyl) ester distills at 66 to 69° C. at a pressure of 0.1 mm. Hg. The yield amounts to 92% of the theoretical.

*Analysis.*—Calc. for $C_5H_{10}O_3PSCl_2F$: C, 22.2%; H, 3.7%; P, 11.4%; S, 11.8%; Cl, 26.2%; F, 7.0%. Found: C, 23.4%; H, 4.0%; P, 11.6%; S, 11.9%; Cl, 25.9%; F, 6.8%.

If 0.2 mole of O,O,O-triethyl-phosphorous acid ester are employed in lieu of the corresponding O,O-diethyl ester, the compound with the above stated formula is obtained in about the same yield.

*Example 3*

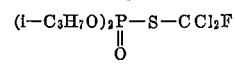

A solution of 31.2 g. of O,O,O-triisopropyl-phosphorous acid ester in 75 ml. of benzene is added dropwise with stirring to a solution of 25.5 g. of fluorodichloromethyl-sulphenyl chloride in 75 ml. of benzene. During this operation, the ensuing strongly exothermal reaction is moderated by appropriate external cooling to such an extent that the internal temperature of the mixture does not exceed 45 to 50° C. The reaction mixture is subsequently stirred at 45 to 50° C. for about ½ hour and it is then evaporated in vacuo. 27 g. of the O,O-diisopropyl-thiolphosphoric acid-S-(fluorodichloromethyl) ester are obtained as the residue in the form of a yellowish oil, which is clarified by filtration through a sintered glass filter.

*Example 4*

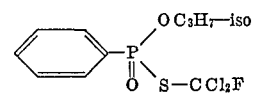

A solution of 45.2 g. of phenyl-phosphonous acid-O,O-diisopropyl ester in 75 ml. of benzene is added dropwise to a solution of 34 g. of fluorodichloromethyl-sulphenyl chloride in 75 ml. of benzene by the same method as described in Example 3. An internal temperature of about 35° C. is maintained during this operation by slight external cooling of the mixture. When the dropwise addition has been completed, the reaction mixture is heated with stirring. Vigorous evolution of gas occurs from about 75° C. The mixture is heated at the boiling point for about 20 minutes, and it is subsequently evaporated under reduced pressure. There remain about 57 g. of the phenyl-thiolphosphonic acid-O-isopropyl-S-(fluorodichloromethyl) ester in the form of a light yellow oil.

*Example 5*

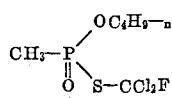

34 g. of fluorodichloromethyl-sulphenyl chloride are reacted with 38.5 g. of methyl-phosphonous acid-O,O-n-dibutyl ester in a benzene solution by methods analogous to that described in Example 4. The reaction mixture is subsequently heated to boiling for about ¼ hour and it is then evaporated in vacuo. 51 g. of the methyl-thiolphosphonic acid-O-n-butyl-S-(fluorodichloromethyl)ester are obtained as the residue in the form of an orange-brown oil, which is freed from undissolved impurities by filtration through a sintered glass filter.

*Example 6*

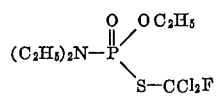

38.6 g. of N,N-diethylamido-phosphorous acid-O,O-diethyl ester are added dropwise to a solution of 34 g. of fluorodichloromethyl-sulphenyl chloride in 75 ml. of benzene as described in the preceding examples, when a colourless precipitate separates. Subsequently, the reaction mixture is gradually heated to boiling. Evolution of ethyl chloride commences from about 65° C. The mixture is allowed to boil for about ¼ hour and it is then evaporated under reduced pressure. This produces a residue of 55 g. of the N,N-diethylamido-thiolphosphoric acid-O-ethyl-S-(fluorodichloromethyl) ester in the form of a brown oil, which cannot be distilled without decomposition even in a high vacuum.

Example 7

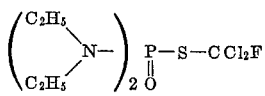

A solution of 44 g. of bis-(N,N-diethylamido)-phosphorous acid-O-ethyl ester in 75 ml. benzene is added dropwise to a solution of 34 g. of fluorodichloromethyl-sulphenyl chloride in 75 ml. of benzene, and the reaction mixture is subsequently worked up as described in the preceding example. There are obtained 65 g. of the bis-(N,N - diethylamido) - thiolphosphoric acid - S-(fluorodichloromethyl) ester in the form of a red-brown oil, which is clarified by filtration through a sintered glass filter.

Example 8

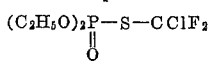

A solution of 33 g. of O,O,O-triethyl-phosphorous acid ester in 50 ml. of benzene is added dropwise to a solution of 30.6 g. of chlorodifluoromethyl-sulphenyl chloride in 50 ml. of benzene, when a colourless precipitate separates. When the mixture is subsequently heated to boiling, this solid redissolves with the evolution of ethyl chloride. After the reaction mixture has been boiled for 10 minutes, the latter is evaporated in vacuo, when about 35 g. of O,O - diethyl - thiolphosphoric acid - S-(difluorochloromethyl) ester remain in the form of a red oil, which is freed from undissolved impurities by filtration through a sintered glass filter.

Example 9

The active agents described in detail below are applied on supports of wood, filter paper, etc., at the stated different concentrations, and tested for their insecticidal activity. The results obtained are summarised in the following table:

| Compound (Constitution) | Flies (*Musca domestica*), conc. of active agent in percent | 100% destruction of the pests after— | Yellow fever mosquitoes (*Aedes aegyptii*), conc. of active agent in percent | 100% destruction of the pests after— | Grain weevils (*Calandra granaria*) Conc. of active agent in percent | Destruction of pest in percent |
|---|---|---|---|---|---|---|
| $(C_2H_5O)_2\overset{O}{\overset{\|}{P}}-S-CCl_2F$ | 0.1<br>0.01<br>0.001<br>0.0001 | 10'<br>20'<br>90'<br>>4ʰ | 0.1<br>0.01<br>0.001<br>0.0001 | 60'<br>60'<br>180'<br>>3ʰ | 0.1<br>0.01<br>0.001 | 100<br>100<br>0 |
| $(CH_3O)_2\overset{O}{\overset{\|}{P}}-S-CCl_2F$ | 0.1<br>0.01<br>0.001<br>0.0001 | 7'<br>30'<br>130'<br>4ʰ | 0.1<br>0.01<br>0.001<br>0.0001 | 60'<br>60'<br>60'<br>3ʰ | 0.1<br>0.01<br>0.001 | 100<br>100<br>0 |
| $(CH_3O)_2\overset{O}{\overset{\|}{P}}-S-CClF_2$ | 0.1<br>0.01<br>0.001<br>0.0001 | 5'<br>13'<br>90'<br>>4ʰ | 0.1<br>0.01<br>0.001<br>0.0001 | 60'<br>60'<br>60'<br>>3ʰ | 0.1<br>0.01<br>0.001 | 100<br>90<br>0 |
| $CH_3-\overset{O}{\overset{\|}{P}}\overset{OC_4H_9}{\underset{S-CCl_2F}{}}$ | 0.1<br>0.01 | 12'<br>45' | 0.1<br>0.01<br>0.001<br>0.0001 | 60'<br>60'<br>60'<br>3ʰ | 0.1<br>0.01<br>0.001 | 100<br>100<br>0 |
| Phenyl-$\overset{O}{\overset{\|}{P}}\overset{OC_3H_7iso}{\underset{S-CCl_2F}{}}$ | 0.1<br>0.01 | 20'<br>80' | 0.1<br>0.01<br>0.001 | 60'<br>180'<br>3ʰ | 0.1<br>0.01 | 100<br>0 |
| $(C_2H_5O)_2\overset{O}{\overset{\|}{P}}-S-CCl_3$ | 0.1<br>0.01 | 45'<br>8ʰ | 0.1<br>0.01 | 60'<br>120' | 0.1<br>0.01 | 100<br>0 |

(Known comparative product).

Example 10

The compounds according to the invention which are listed below are dissolved in acetone and these solutions are sprayed into sealed experimental rooms. The aerosol activity of the solutions of the active agents is subsequently estimated on flies (*Musca domestica*).

The experimental results as summarised below in the table are obtained:

| Compound (Constitution) | Conc. of active agent in mg./m.³ | (a) Initial effect | (b) LD₅₀ | (c) LD₉₅ |
|---|---|---|---|---|
| $(CH_3O)_2\overset{O}{\overset{\|}{P}}-S-CCl_2F$ | 20<br>10 | 9<br>22 | 14<br>25 | 20<br>37 |
| $(C_2H_5O)_2\overset{O}{\overset{\|}{P}}-S-CCl_2F$ | 20<br>10 | 6<br>12 | 9<br>21 | 15<br>28 |
| $(CH_3O)_2\overset{O}{\overset{\|}{P}}-S-CClF_2$ | 10 | 13 | 18 | 26 |
| $CH_3-\overset{O}{\overset{\|}{P}}\overset{OC_4H_9}{\underset{S-CCl_2F}{}}$ | 10 | 18 | 26 | 39 |

Example 11

The compounds according to the invention with the constitution specified below are added to self-combustible slow burning compositions and these are used for fumigation. During this operation, the insecticidal activity is estimated against flies (*Musca domestica*). The following results are obtained:

| Compound (Constitution) | Conc. of active agent in mg./m.$^3$ | Destruction of pests, in minutes, after— | | |
|---|---|---|---|---|
| | | (a) Initial effect | (b) LD$_{50}$ | (c) LD$_{95}$ |
| 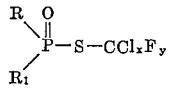 | 50 | 8 | 11 | 15 |
| (C$_2$H$_5$O)$_2$P(=O)—S—CCl$_2$F | 50 | 8 | 12 | 24 |

We claim:

1. A compound of the formula $$\begin{matrix} R & O \\ \diagdown & \| \\ & P-S-CCl_xF_y \\ \diagup \\ R_1 \end{matrix}$$

in which R and R$_1$ stand for members selected from the group consisting of lower alkyl, lower alkoxy, phenyl and lower dialkylamino, said lower alkyl and lower alkoxy having up to 4 carbon atoms and wherein $x$ stands for an integer of from zero to two and $y$ stands for an integer of from one to three, the sum of $x$ and $y$ being three.

2. The compound of claim 1 wherein R and R$_1$ are lower alkoxy.
3. The compound of claim 2 wherein $x$ is 2 and F is 1.
4. The compound of claim 1 wherein R is lower alkoxy and R$_1$ is phenyl.
5. The compound of claim 4 wherein $x$ is 2 and $y$ is 1.
6. The compound of claim 1 wherein R is lower alkoxy and R$_1$ is lower alkyl.
7. The compound of claim 6 wherein $x$ is 2 and $y$ is 1.
8. The compound of claim 1 wherein R is lower dialkylamino and R$_1$ is lower alkoxy.
9. The compound of claim 8 wherein $x$ is 2 and $y$ is 1.
10. The compound of claim 1 wherein R and R$_1$ are lower dialkylamino.
11. The compound of claim 10 wherein $x$ is 2 and $y$ is 1.
12. The compound of claim 2 wherein $x$ is 1 and $y$ is 2.
13. A compound of the formula

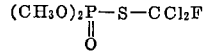

14. A compound of the formula

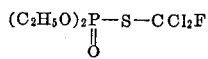

15. A compound of the formula

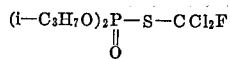

16. A compound of the formula

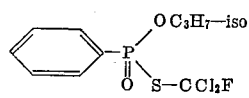

17. A compound of the formula

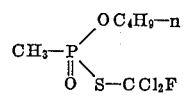

18. A compound of the formula

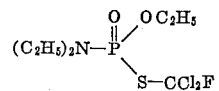

19. A compound of the formula

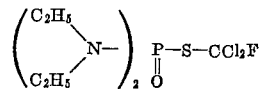

20. A compound of the formula

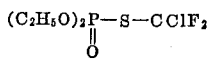

References Cited by the Examiner

UNITED STATES PATENTS 2,811,543  10/1957  Coover et al. _____ 260—461.112
2,818,364  12/1957  Birum _____ 260—461.112 X
2,931,755   4/1960  Birum _____ 260—461.112

OTHER REFERENCES

Kabachnik et al.: "Zhur. Obshchei Khim.," volume 29, pp. 1671–1680 (1959).

CHARLES B. PARKER, *Primary Examiner.*

IRVING MARCUS, *Examiner.*

F. M. SIKORA, *Assistant Examiner.*